(12) United States Patent
Nagaraj et al.

(10) Patent No.: US 10,781,526 B2
(45) Date of Patent: Sep. 22, 2020

(54) ARTICLE WITH IMPROVED COATING SYSTEM AND METHODS OF FORMING THE SAME

(71) Applicant: General Electric Company, Schenectady, NY (US)

(72) Inventors: Bangalore Aswatha Nagaraj, Westchester, OH (US); Siva Ram Surya Sanyasi Adavikolanu, Karnataka (IN); Michal Stanislaw Chomka, Masovian Voivodeship (PL)

(73) Assignee: General Electric Company, Schenectady, NY (US)

( * ) Notice: Subject to any disclaimer, the term of this patent is extended or adjusted under 35 U.S.C. 154(b) by 7 days.

(21) Appl. No.: 15/443,039

(22) Filed: Feb. 27, 2017

(65) Prior Publication Data

US 2017/0247808 A1 Aug. 31, 2017

(30) Foreign Application Priority Data

Feb. 26, 2016 (PL) .......................................... 416283

(51) Int. Cl.
*C23C 4/134* (2016.01)
*C25D 3/50* (2006.01)
(Continued)

(52) U.S. Cl.
CPC .............. *C25D 5/022* (2013.01); *C23C 4/134* (2016.01); *C23C 10/04* (2013.01); *C23C 10/48* (2013.01);
(Continued)

(58) Field of Classification Search
CPC ....... B64C 23/00; B64C 23/005; B64C 21/00; B64C 21/02; B64C 21/10; C23C 10/04;
(Continued)

(56) References Cited

U.S. PATENT DOCUMENTS 3,554,780 A 1/1971 Miller et al.
5,551,840 A 9/1996 Benoit et al.
(Continued)

FOREIGN PATENT DOCUMENTS

CN 1939989 A 4/2007
CN 104271889 A 1/2015
(Continued)

OTHER PUBLICATIONS

Polish Search Report issued in connection with corresponding PL Application No. P-416283 dated May 11, 2017.
(Continued)

*Primary Examiner* — Alexander M Weddle
(74) *Attorney, Agent, or Firm* — Dority & Manning, P.A.

(57) ABSTRACT

A method for forming a coating on a surface of an airfoil is provided, where the airfoil has a leading edge, a trailing edge, a pressure side, and a suction side. The method can include forming a platinum-group metal layer on the surface of the airfoil along at least a portion of the trailing edge, and forming an aluminide coating over the surface of the airfoil of the leading edge, the trailing edge, the pressure side, and the suction side. The leading edge may be substantially free from any platinum-group metal. The method may further include, prior to forming the aluminide coating, forming a bond coating on the surface of the airfoil along the leading edge, and after forming the aluminide coating, forming a thermal barrier coating over the bond coating. A method is also generally provided for repairing a coating on a surface of an airfoil.

19 Claims, 5 Drawing Sheets

(51) Int. Cl.
  C25D 5/02    (2006.01)
  C25D 5/50    (2006.01)
  C25D 7/00    (2006.01)
  C23C 28/00   (2006.01)
  C23C 10/60   (2006.01)
  C23C 10/04   (2006.01)
  C23C 10/48   (2006.01)
  F01D 5/00    (2006.01)
  F01D 5/28    (2006.01)

(52) U.S. Cl.
  CPC .......... *C23C 10/60* (2013.01); *C23C 28/321* (2013.01); *C23C 28/3455* (2013.01); *C25D 5/50* (2013.01); *C25D 7/00* (2013.01); *C25D 7/008* (2013.01); *F01D 5/005* (2013.01); *F01D 5/288* (2013.01); *C25D 3/50* (2013.01); *F05D 2240/121* (2013.01); *F05D 2240/122* (2013.01); *F05D 2300/143* (2013.01); *F05D 2300/2112* (2013.01); *Y02T 50/673* (2013.01); *Y02T 50/6765* (2018.05)

(58) Field of Classification Search
  CPC ....... C23C 10/48; C23C 10/60; C23C 28/321; C23C 28/3455; C23C 4/134; C25D 3/50; C25D 3/567; C25D 5/022; C25D 5/50; C25D 7/00
  See application file for complete search history.

(56) References Cited

U.S. PATENT DOCUMENTS

| | | | |
|---|---|---|---|
| 5,813,118 | A | 9/1998 | Roedl et al. |
| 5,902,471 | A | 5/1999 | Jordan et al. |
| 6,042,880 | A | 3/2000 | Rigney et al. |
| 6,265,022 | B1 | 7/2001 | Fernihough et al. |
| 6,695,587 | B2 | 2/2004 | Wustman et al. |
| 7,083,824 | B2 | 8/2006 | Stankowski et al. |
| 7,147,899 | B2 | 12/2006 | Fernihough et al. |
| 7,662,484 | B2 | 2/2010 | Kliewe |
| 8,708,658 | B2 | 4/2014 | Milleville |
| 2002/0172808 | A1* | 11/2002 | Wustman .............. C23C 10/58 428/195.1 |
| 2006/0199032 | A1* | 9/2006 | Nagaraj .................. C23C 4/08 428/632 |
| 2010/0062180 | A1* | 3/2010 | Tuppen ................. B23P 6/002 427/555 |
| 2013/0011270 | A1* | 1/2013 | Berger .................... C25D 5/50 416/229 R |
| 2016/0047029 | A1 | 2/2016 | Fairbourn |

FOREIGN PATENT DOCUMENTS

| | | |
|---|---|---|
| EP | 0 844 368 A2 | 5/1998 |
| EP | 1 013 787 A1 | 6/2000 |
| EP | 1 403 469 A2 | 3/2004 |
| EP | 1 627 936 A2 | 2/2006 |
| EP | 2 072 759 A2 | 6/2009 |
| EP | 2 662 529 A1 | 11/2013 |
| WO | WO-2013167312 A1 * | 11/2013 ......... C23C 28/3455 |

OTHER PUBLICATIONS

Extended European Search Report and Opinion issued in connection with corresponding EP Application No. 17157453.6 dated Jun. 2, 2017.

Machine Translation and First Office Action and Search issued in connection with corresponding CN Application No. 201710109332.7 dated Oct. 26, 2018.

Nagaraj, B.A., et al., Article with improved coating system and methods of forming the same, GE co-pending Application No. P-416281, filed on Feb. 26, 2016.

Office Action issued in connection with corresponding CA Application No. 2958099 dated Mar. 28, 2018.

* cited by examiner

ARTICLE WITH IMPROVED COATING SYSTEM AND METHODS OF FORMING THE SAME

FIELD OF THE INVENTION

The present invention generally relates to protective coatings on articles, and, more particularly, to aluminide and platinum-group metal aluminide coatings on aircraft gas turbine components having airfoils.

BACKGROUND OF THE INVENTION

In an aircraft gas turbine (jet) engine, air is drawn into the front of the engine, compressed by a shaft-mounted compressor, and mixed with fuel. The mixture is combusted, and the resulting hot combustion gases are passed through a turbine mounted on the same shaft. The flow of gas turns the turbine by contacting an airfoil portion of the turbine blade, which turns the shaft and provides power to the compressor. The hot exhaust gases flow from the back of the engine, driving it and the aircraft forwardly.

The hotter the turbine gases, the more efficient the operation of the jet engine. Thus, there is an incentive to raise the turbine operating temperature. However, the maximum temperature of the turbine gases is normally limited by the materials used to fabricate the turbine vanes and turbine blades of the turbine. In current engines, the turbine vanes and blades are made of nickel-based or cobalt-based superalloys that can operate at temperatures of up to about 1900° F. to 2100° F.

Many approaches have been used to increase the operating temperature limits and operating lives of the airfoils of the turbine blades and vanes. The compositions and processing of the materials themselves have been improved. The articles may be formed as oriented single crystals to take advantage of superior properties observed in certain crystallographic directions. Physical cooling techniques are used. For example, internal cooling channels may be provided within the components, and cooler air is forced through the channels during engine operation.

In another approach, a protective layer is applied to the airfoil of the turbine blade or turbine vane component, which acts as a substrate. Among the currently known diffusional protective layers are aluminide and platinum aluminide layers. The protective layer protects the substrate against environmental damage from the hot, highly corrosive combustion gases. This protective layer, with no overlying ceramic layer, is useful in intermediate-temperature applications. For higher temperature applications, a ceramic thermal barrier coating layer may be applied overlying the protective layer, to form a thermal barrier coating (TBC) system. The ceramic thermal barrier coating layer insulates the component from the exhaust gas, permitting the exhaust gas to be hotter than would otherwise be possible with the particular material and fabrication process of the substrate.

Even with the use of these protective techniques, there remain problems to overcome in extending the operating service temperatures and operating lives of the turbine blade components. For example, some portions of the airfoil have been observed to fail prematurely due to low-cycle fatigue, wherein that portion of the airfoil is subjected to repetitive, relatively large strain cycles at elevated temperature. There is a need for an approach to overcoming such problems, while retaining the benefits of the available protection techniques.

BRIEF DESCRIPTION OF THE INVENTION

Objects and advantages of the invention will be set forth in part in the following description, or may be obvious from the description, or may be learned through practice of the invention.

A method is generally provided for forming a coating on a surface of an airfoil having a leading edge, a trailing edge, a pressure side, and a suction side. In one embodiment, the method includes forming a platinum-group metal layer on the surface of the airfoil along at least a portion of the trailing edge, and forming an aluminide coating over the surface of the airfoil of the leading edge, the trailing edge, the pressure side, and the suction side. For example, the leading edge may be substantially free from any platinum-group metal.

In one particular embodiment, forming the platinum-group metal layer on the surface of the airfoil along the trailing edge can be accomplished via masking the leading edge, at least a portion of the pressure side, and at least a portion of the suction side to define a masked region and leaving at least a portion of the trailing edge to define an unmasked area; plating the unmasked area with a platinum-group metal; and thereafter, removing the mask to leave the surface underlying the masked region substantially free from the platinum-group metal.

In one embodiment, the method may further include, prior to forming the aluminide coating, forming a bond coating on the surface of the airfoil along the leading edge such that the bond coating is formed on the surface of the airfoil only in areas free from platinum. The method may also include, in certain embodiments, after forming the aluminide coating, forming a thermal barrier coating over the bond coating.

A method is also generally provided for repairing a coating on a surface of an airfoil having a leading edge, a trailing edge, a pressure side, and a suction side. In one embodiment, the method includes stripping any coating from the surface of the airfoil (e.g., the entire surface of the airfoil or a portion of the surface of the airfoil); forming a platinum-group metal layer on the surface of the airfoil along at least a portion of the trailing edge; and forming an aluminide coating over the surface of the airfoil of the leading edge, the trailing edge, the pressure side, and the suction side.

A method is also generally provided for forming a coating on a surface of an airfoil having a leading edge, a trailing edge, a pressure side, and a suction side. In one embodiment, the method includes forming a platinum-group metal layer on a first region of the surface of the airfoil leaving a second region substantially free from platinum; heat treating the platinum-group metal layer; thereafter, forming a bond coating over at least a portion of the second region substantially free from platinum on the surface of the airfoil; thereafter, forming an aluminide coating over the entire surface of the airfoil.

Other features and aspects of the present invention are discussed in greater detail below.

BRIEF DESCRIPTION OF THE DRAWINGS

The invention may be best understood by reference to the following description taken in conjunction with the accompanying drawing figures in which.

Figure 1:
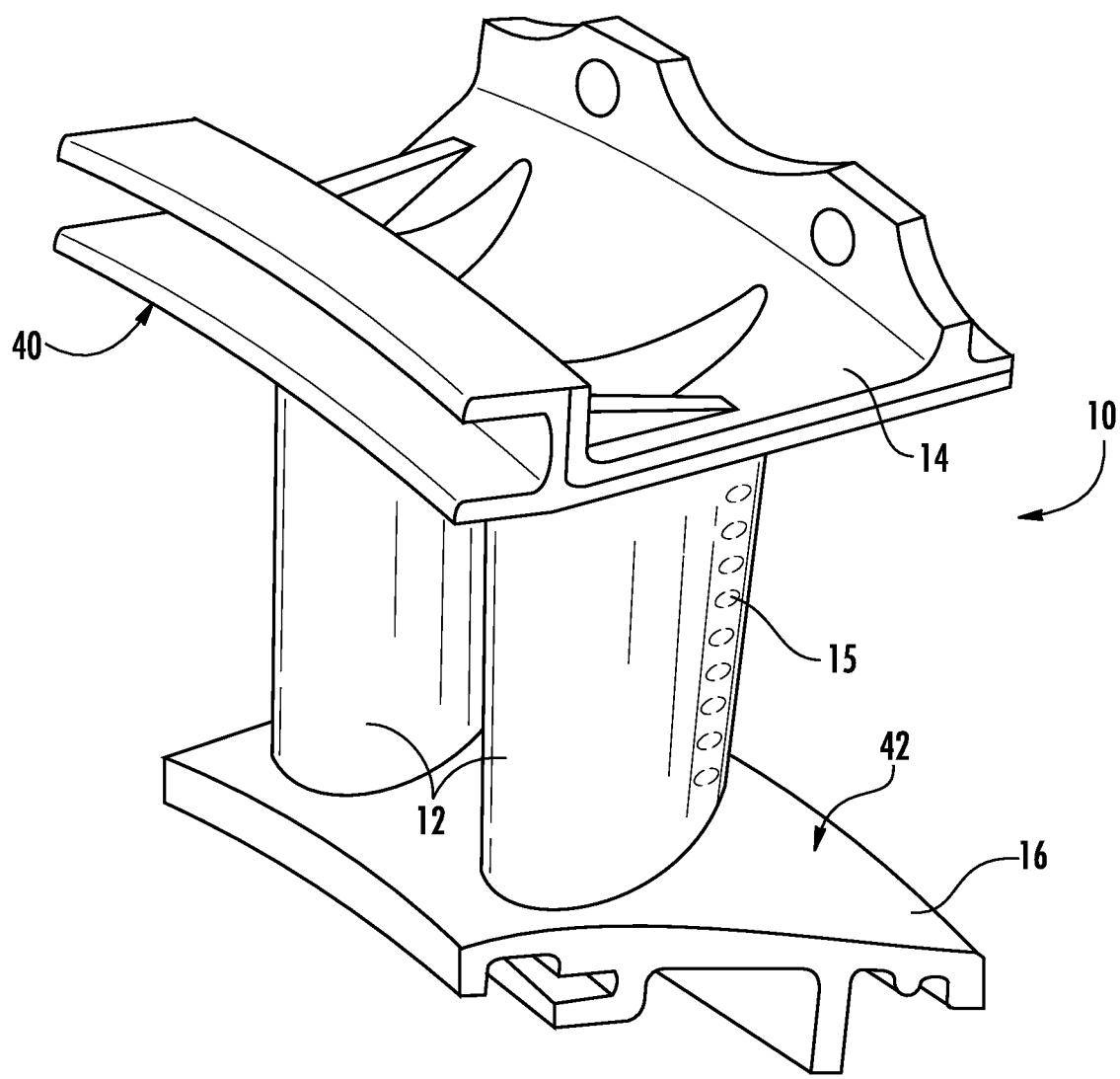
FIG. 1 is a perspective view of a nozzle segment of a gas turbine engine.

Repeat use of reference characters in the present specification and drawings is intended to represent the same or analogous features or elements of the present invention.

DETAILED DESCRIPTION OF THE INVENTION

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

A coating system is generally provided for hot gas path components (e.g., airfoils) of gas turbine engines, along with methods of its formation. The coating system has a non-uniform chemistry across the surface of the component, with at least a portion of the trailing edge of the component including a platinum-group metal aluminide coating. In one embodiment, the coating system includes a platinum-group metal aluminide coating exposed on a first region of the surface of the airfoil (e.g., at least a portion of the trailing edge, optionally a portion of the suction side, and/or optionally a portion of the pressure side), an aluminide coating over the surface of the airfoil on a second region of the surface of the airfoil (e.g., the leading edge, at least a portion of the suction side, and/or at least a portion of the suction side); and a thermal barrier coating exposed on at least a portion of the second region of the surface of the airfoil (e.g., the leading edge, at least a portion of the suction side, and/or at least a portion of the suction side).

For example, in one particular embodiment, the coating system has the platinum-group metal aluminide coating on the surface of the airfoil along at least a portion of the trailing edge (and optionally a portion of the suction side and optionally a portion of the trailing edge) such that the aluminide coating along the leading edge is substantially free from any platinum-group metal, particularly platinum.

The coating system can reduce the susceptibility of gas turbine components to property degradation such as low-cycle fatigue failures, while retaining the benefits associated with protective coatings that are applied to the components.

The present approach takes a highly selective approach to the protection of the turbine components, optimizing the performance of the protective system at various portions of the component. Expensive platinum-group metals, particularly platinum, is conserved, although this is a relatively minor benefit. The present approach may be accomplished as part of the normal production operation, without major modifications.

FIG. 1 represents a nozzle segment 10 that is one of a number of nozzle segments that when connected together form an annular-shaped nozzle assembly of a gas turbine engine. The segment 10 is made up of multiple vanes 12, each defining an airfoil and extending between outer and inner platforms (bands) 14 and 16. The vanes 12 and platforms 14 and 16 can be formed separately and then assembled, such as by brazing the ends of each vane 12 within openings defined in the platforms 14 and 16. Alternatively, the entire segment 10 can be formed as an integral casting. When the nozzle segment 10 is assembled with other nozzle segments to form a nozzle assembly, the respective inner and outer platforms of the segments form continuous inner and outer bands between which the vanes 12 are circumferentially spaced and radially extend. Construction of a nozzle assembly with individual nozzle segments is often expedient due to the complexities of the cooling schemes typically employed. The nozzle segment 10 depicted in FIG. 1 is termed a doublet because two vanes 12 are associated with each segment 10. Nozzle segments can be equipped with more than two vanes, e.g., three vanes (termed a triplet), four vanes, six vanes, or with a single vane to form what is termed a singlet. As known in the art, the design choice between singlet and doublet castings takes into consideration the advantages associated with their different constructions and processing. A significant advantage of singlet nozzle construction is the capability for excellent coating thickness distribution around the vanes 12, which in addition to promoting oxidation and corrosion resistance also promotes control of the throat area between nozzles and uniformity between vanes of different stages. On the other hand, a doublet casting avoids the necessity for a high temperature braze operation, though with less control of coating thickness.

In one embodiment, the vanes 12 and the surfaces of the platforms 14 and 16 facing the vanes 12 are located in the turbine section of the engine and are subjected to the hot combustion gases from the engine's combustor. In addition to forced air cooling techniques (e.g., via film holes 15), the surfaces of the vanes 12 and platforms 14 and 16 are protected by a coating system 18 on their respective surfaces 13. For example, in one particular embodiment, the surfaces of the platforms 14 and 16 are coated via the same methods utilized with respect to coating the leading edge 22 discussed below (i.e., a bond coating, an aluminide coating, and a thermal barrier coating), and may be coated simultaneously with the leading edge 22.

The vanes 12 can be formed of a material that can be formed to the desired shape and withstand the necessary operating loads at the intended operating temperatures of the area of the gas turbine in which the segment will be installed. Examples of such materials include metal alloys that include, but are not limited to, titanium-, aluminum-, cobalt-, nickel-, and steel-based alloys. The vanes 12 generally have a leading edge 22, a trailing edge 24, a pressure side 26 (i.e., the concave side), and a suction side 28 (i.e., the convex side). The leading edge 22 is at times described as being defined by the most forward point (nose) of the airfoil 12.

Figure 2:
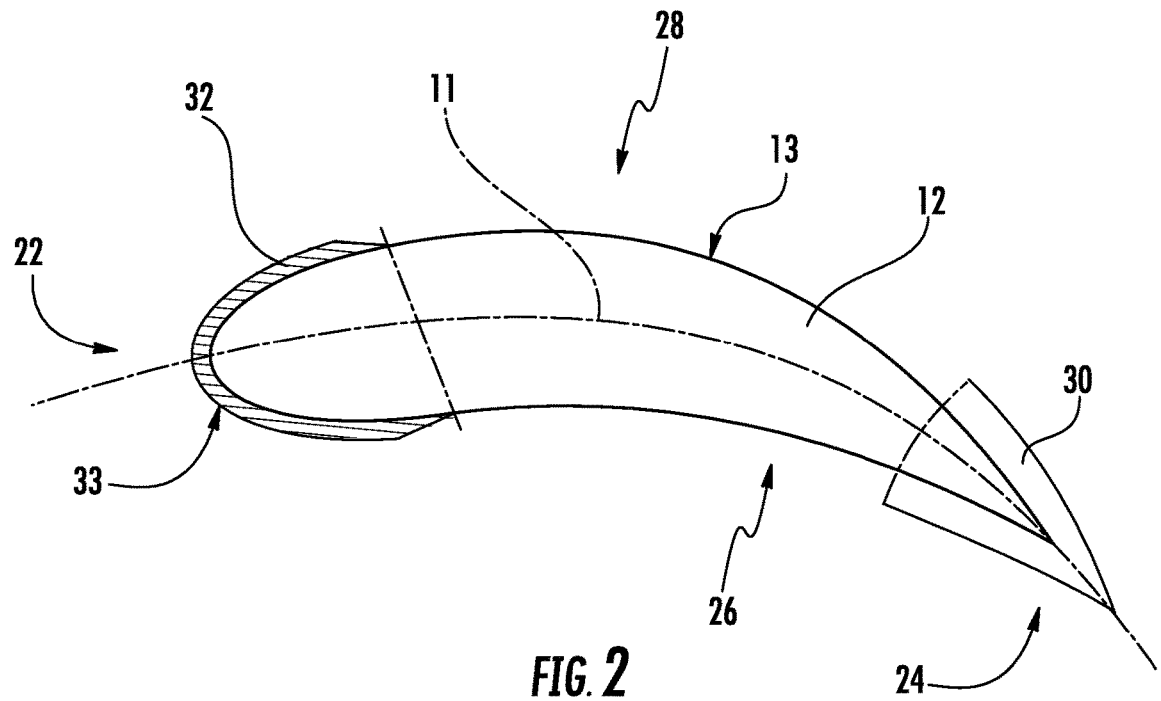
FIG. 2 is a cross-sectional view of an exemplary airfoil of the nozzle segment of FIG. 1 after forming a platinum-group metal layer on the trailing edge and a bond coating on the leading edge.
Figure 3:
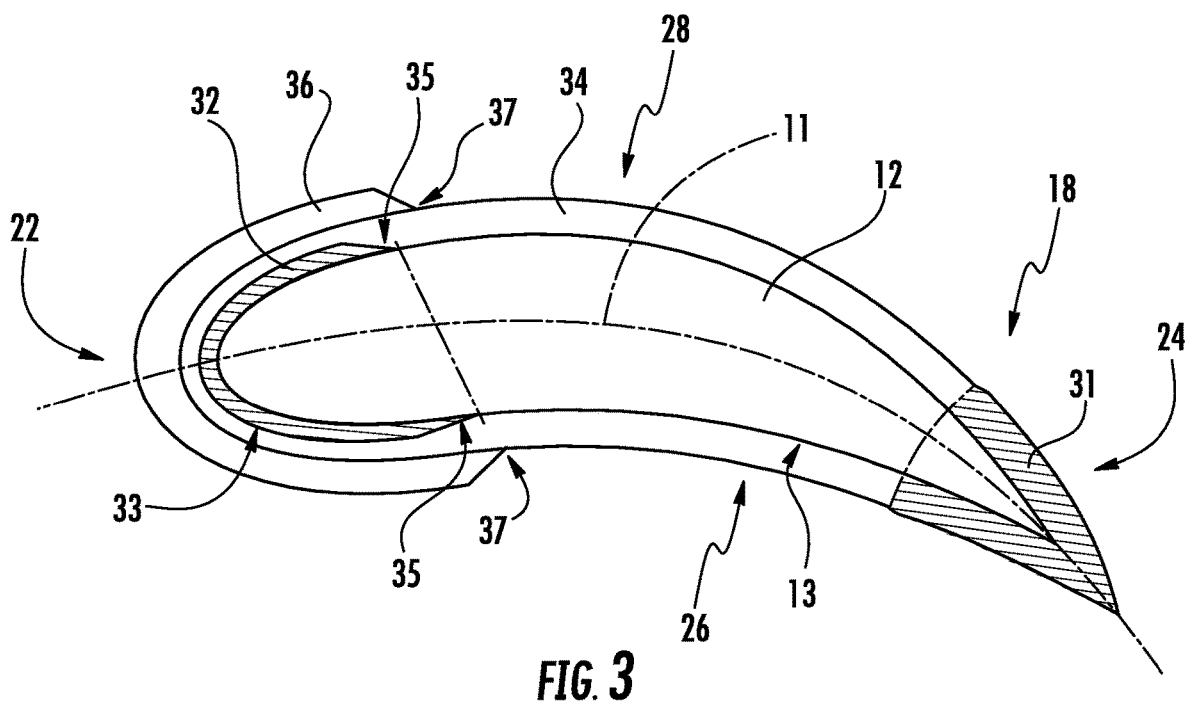
FIG. 3 is a cross-sectional view of an exemplary airfoil of the nozzle segment of FIG. 2 after applying an aluminide coating and forming a TBC over the leading edge.

Referring to FIGS. 2 and 3, the coating system 18 is formed by forming a platinum-group metal layer 30 on the surface 13 of the airfoil 12 along the trailing edge 24. In the embodiment shown in FIG. 2, the platinum-group metal layer 30 is formed on the surface 13 of the airfoil 12 only along the trailing edge 24 such that the leading edge 22, the pressure side 26, and the suction side 28 are substantially free from any platinum-group metal on their respective surfaces 13.

In one embodiment, the leading edge 22 spans up to about the first 33% of the camber line 11 of the airfoil 12 (e.g., about 10% to about 30% of the first length of the camber line). Conversely, the trailing edge 24 spans up to about the last 33% of the camber line 11 of the airfoil 12 (e.g., about 10% to about 30% of the last length of the camber line). The pressure side 26 and the suction side 28 span the surface 13 between the leading edge 22 and the trailing edge 24 on their respective sides.

The platinum-group metal layer 30 generally includes platinum, rhodium, palladium, ruthenium, osmium, iridium, or a mixture thereof. These elements have similar physical and chemical properties and tend to occur together in the same mineral deposits. In one embodiment, the palladium-group platinum-group metals (i.e., platinum, rhodium, palladium, or a mixture thereof) are included in the platinum-group metal layer 30. In one particular embodiment, the platinum-group metal layer 30 generally includes platinum, but may also include other elements (e.g., palladium and/or rhodium). For example, the platinum-group metal layer 30 can include a platinum-palladium alloy, a platinum-rhodium alloy, or a platinum-palladium-rhodium alloy. In one embodiment, platinum-group metal layer 30 includes platinum in at least 50% by weight (e.g., about 75% to 100% by weight).

In most embodiments, a suitable thickness for a platinum-group metal layer 30 is about 1 μm to about 10 μm (e.g., about 3 μm to about 7 μm). In the embodiment shown, the platinum-group metal layer 30 is formed directly on the surface 13 along the trailing edge 24 due to this relatively thin nature of the platinum-group metal layer. As such, no other layer (e.g., a bond coating) is positioned between the surface 13 and the platinum-group metal layer 30.

The platinum-group metal layer 30 can be formed, in one embodiment, via a masking and electroplating (e.g., platinum plating) process. For example, the leading edge 22, the pressure side 26, and the suction side 28 can be masked to leave only the trailing edge 24 exposed for forming the platinum-group metal layer 30 thereon. Masking is accomplished by any operable technique that will prevent the deposition of the platinum-group metal into the masked portion. For example, the masked portion (i.e., the leading edge 22, the pressure side 26, and the suction side 28) may be covered with a physical mask such as an illustrated plastic clip of the appropriate size, such as a mask made of plastic. The masked portion may instead be covered with a maskant applied to the surface of the article, such as a lacquer, tape, or wax. The masking of the masked portion defines the masked portion and an unmasked portion (i.e., the trailing edge 24).

The platinum-group metal layer 30 deposited by an electrodeposition process as (e.g., electroplating), although sputtering, brush plating, etc. could alternatively be used. Plating can be performed at room temperature (e.g., about 20° C. to about 25° C.). In one embodiment, the electrodeposition process is accomplished by placing a platinum-group metal-containing solution (e.g., platinum-containing solution) into a deposition tank and depositing platinum-group metal from the solution onto the surface 13. For example, when depositing platinum, the platinum-containing aqueous solution can include $Pt(NH_3)_4 HPO_4$, and the voltage/current source can be operated at about ½-10 amperes per square foot of facing article surface. In the deposition, the platinum-group metal layer 30 is deposited onto the unmasked portion of the surface 13 (i.e., the trailing edge 24). Though the platinum-group metal may be deposited onto the mask during deposition, the underlying masked portion (e.g., the leading edge 22, the pressure side 26, and the suction side 28) will be free from the platinum-group metal. Thereafter, the mask (not shown) can be removed to leave the surface 13 along the leading edge 22, the pressure side 26, and the suction side 28 substantially free from the platinum-group metal (e.g., platinum). Where the mask is a separate article such as the plastic clip, it is simply lifted away. Where the mask is an overlay maskant such as a lacquer, tape, or wax, it is stripped away mechanically, chemically with a solvent, or physically by melting. FIG. 2 shows the resulting platinum-group metal layer 30 only on the trailing edge 24.

The platinum-group metal layer 30 may be heat treated, as desired. For example, the platinum-group metal layer 30 can be heat treated at a treatment temperature of about 900° C. to about 1200° C. In one embodiment, the platinum-group metal layer 30 is heat treated in a vacuum (e.g., at a treatment pressure of about 10 torr or less, such as at a treatment pressure of about 1 torr or less).

Also shown in FIG. 2, a bond coating 32 is applied over the leading edge 22. In the embodiment shown, the bond coating 32 is formed on the surface 13 of the airfoil 12 only along the leading edge 22 such that the trailing edge 24, the pressure side 26, and the suction side 28 are substantially free from the bond coating 32. In the embodiments of a segmented nozzle, the bond coating 32 can also be deposited on surfaces defined by the outer band and inner band. For example, the bond coating may be applied only in the areas desired via a masking process. However, in other embodiments, the bond coating 32 can also be applied on the pressure side 26 and/or the suction side 28. The bond coating 32 is shown having a taper 35 to transition from the leading edge 22 to the pressure side 26 and to the suction side 28. As such, the aerodynamics of the resulting surface is minimally affected.

In certain embodiments, the bond coating 32 may be formed to a thickness of about 125 μm to about 525 μm. The bond coating 32 can be a metallic bond coat made up of one or more metal layers of, for example, one or more layers of titanium alloys, titanium aluminum alloys (e.g., titanium aluminide intermetallics), nickel chromium alloys (e.g., NiCrAlY), etc. In one embodiment, the bond coating includes (by weight percent) about 17 to about 19 wt % chromium, about 6 to about 7 wt % aluminum, about 0.4 to about 0.6% hafnium, about 9 to about 10% cobalt, about 5 to about 7% tantalum, up to about 0.2% yttrium, about 1 to about 3% rheium, about 0.5 to about 1.5% silicon, up to about 0.02% zirconium, with the balance being nickel. Such a composition for the bond coating is particularly suitable for receiving an aluminide coating over it, since the bond coating's aluminum content is relatively low, with the other elements providing strengthening and creep properties, oxidation resistance, and corrosion resistance.

The bond coat can be limited to being located entirely between the overlaying TBC and the surface 13 it protects for the purpose of promoting adhesion of the TBC to the surface 13. In another embodiment, the bond coating 32 may be a strengthened NiCr (e.g., strengthened NiCrAlY alloys) to allow or an oxidation-resistant aluminum-containing alloy or intermetallic whose aluminum content provides for the slow growth of a strong adherent continuous aluminum oxide layer (alumina scale) at elevated temperatures. This thermally grown oxide (TGO) provides protection from oxidation and hot corrosion, and in the case of a bond coating 32 promotes a chemical bond with any overlying layers (e.g., a thermal barrier coating (TBC)).

In one embodiment, the bond coating 32 is formed via air plasma spray (APS) deposition such that a rough surface 33 is formed on the bond coating 32 for subsequent deposition of layers thereon. For example, the surface 33 of the bond coating 32 may have a roughness (Ra) that is about 8 μm or greater. Due to its relatively rough surface, a thermal barrier coating can subsequently be formed onto the bond coating 32 and provide a surface platform for good adhesion thereto.

Referring to FIG. 3, an oxidation-resistant coating 34 is applied to the surface 13 of the airfoil 12 to further promote the oxidation resistance. In one particular embodiment, the oxidation-resistant coating is a diffusion aluminide coating, which may include aluminum intermetallics, beta-phase nickel aluminide, or the like.

An aluminide coating 34 is deposited overlying both the (previously) masked portion and the unmasked portion so as to cover all of the leading edge 22, the trailing edge 24, the pressure side 26, and the suction side 28. The aluminide coating 34 can be formed to a thickness of about 2 μm to about 100 μm (e.g., about 25 μm to about 100 μm, such as about 35 μm to about 75 μm) by any suitable method. For example, the aluminide coating 34 can be deposited by any operable approach, such as aluminiding by pack cementation, or other processes including vapor phase aluminiding.

In one embodiment, the aluminide coating 34 is deposited via vapor phase aluminiding. For example, a hydrogen halide gas, such as hydrogen chloride or hydrogen fluoride, is contacted with aluminum metal or an aluminum alloy to form the corresponding aluminum halide gas. Other elements may be doped into the aluminum layer from a corresponding gas, if desired. The aluminum halide gas contacts the surface 13, depositing the aluminum thereon. The deposition occurs at elevated temperature such as from about 900° C. to about 1125° C. during a cycle time (e.g., a 4 to 20 hour cycle). The aluminide coating 34 is preferably from about 12 to about 125 micrometers thick (such as about 25 μm to about 100 μm, for example about 35 μm to about 75 μm). The deposition technique allows alloying elements to be co-deposited into the aluminide coating 34 if desired, from the halide gas.

Because the deposition of aluminum is performed at elevated temperature, the deposited aluminum atoms interdiffuse with the platinum-group metal layer 30 (or interdiffused platinum/substrate region) and/or the material of the surface 13 forming a diffusion zone. In the trailing edge 24, a diffusion subzone may be formed from interdiffusion of the platinum-group metal layer 30, the aluminum layer 34, and the surface 13 contains platinum, aluminum, and elements found in the substrate, primarily nickel because nickel is the primary component of the surface 13. In the leading edge 22, the pressure side 26, and the suction side 28, a diffusion subzone may be formed from interdiffusion of the aluminum layer 34 and the surface 13 to contain aluminum and elements found in the surface 13, primarily nickel because nickel is its primary component. A significant amount of interdiffusion of the layers is achieved during the aluminum deposition process. Additional interdiffusion may be accomplished if desired by maintaining the structure at elevated temperature after the flow of halide gas is discontinued.

In the embodiment shown in FIG. 3, the aluminide coating 34 is deposited on the entire surface 13, within any cavities and any film holes present in the surface 13, and over the bond coating 32 (when present) and the platinum-group metal layer 30. During processing, the aluminide coating reacts with the platinum-group metal layer 30 to form a platinum-group metal aluminide coating 31 on the surface 13 of the airfoil 12 along the trailing edge 24. This platinum-group metal aluminide coating 31 comprises the platinum-group metal and aluminum, such as platinum-modified aluminides (PtAl), but may contain additional components (e.g., platinum-modified nickel aluminides).

Generally, the aluminide coating 34 merges with the platinum-group metal layer 30 to form the platinum-group metal aluminide coating 31 while keeping the thickness of the resulting platinum-group metal aluminide coating 31 within 10% of the average thickness of the aluminide coating 34 (e.g., about 1% to about 10%) along the leading edge 22, the trailing edge 24, and the pressure side 26. As such, the aerodynamics and flow of the resulting surface is minimally affected.

FIG. 3 also shows an environmental coating 36 (e.g., a thermal barrier coating (TBC)) along the leading edge 22 over the aluminide coating 34 and the bond coating 32, which is particularly useful if further protection is required because the airfoil 12 is to be used at very high temperatures. In particular embodiments, the environmental coating 36 may also be deposited on the surfaces of the inner bands and outer bands, particularly when a bond coating has been previously applied thereon. For example, the thermal barrier coating 36 may be entirely composed of one or more ceramic compositions, and may be bonded to the surface 13 via the bond coating 32. The environmental coating 36 may be applied by any operable technique, with electron beam physical vapor deposition (EB-PVD) being preferred for the preferred yttria-stabilized zirconia coating. The EB-PVD processing may be preceded and/or followed by high-temperature processes that may affect the distribution of elements in the bond coat. The EB-PVD process itself is typically conducted at elevated temperatures. Other coatings, coating compositions, and coating thicknesses are also within the scope of the invention.

The thermal barrier coating 36 is deposited and processed to have a very smooth surface finish, e.g., about 1.5 μm Ra or less, in order to promote the aerodynamics of the nozzle assembly. In one embodiment, the thermal barrier coating 36 has a taper 37 to transition from the leading edge 22 to the pressure side 26 and to the suction side 28. As such, the aerodynamics of the resulting surface is minimally affected. As noted above, the thermal barrier coating 36 preferably has an as-deposited surface roughness of less than about 5 μm Ra. Thereafter, the surface of the environmental coating 36 preferably undergoes processing, preferably peening and then tumbling, to improve the surface finish of the environmental coating 36. Following peening and tumbling, the environmental coating 36 preferably has a surface roughness of not higher than about 2.0 μm Ra, with a typical range being about 1.3 μm to about 1.8 μm Ra on the concave surfaces and leading edges of the vanes, and about 0.5 μm to 1.0 μm Ra on the convex surfaces of the vanes.

Figure 4:
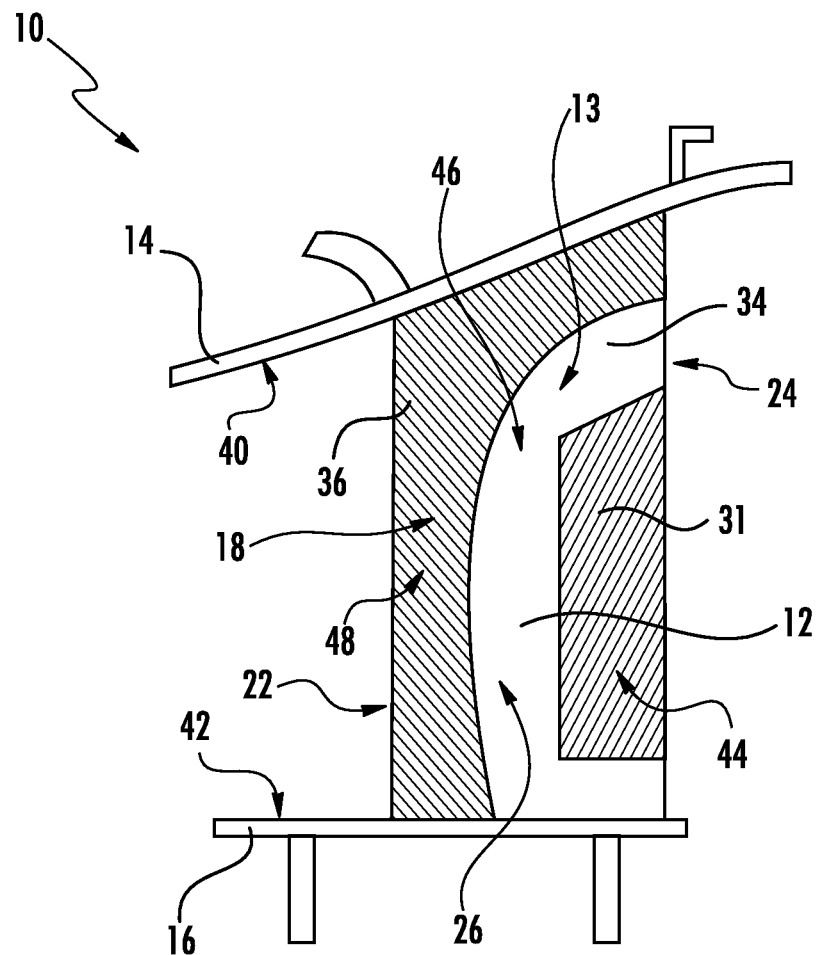
FIG. 4 is a side view of an exemplary airfoil of the nozzle segment of FIG. 2 after applying an aluminide coating and forming a TBC over the leading edge.

FIG. 4 shows another embodiment of a nozzle 10 having an airfoil 12 with a coating system 18 with a platinum-group metal aluminide coating 31 exposed on a first region 44 of the surface 13 of the airfoil 12. As shown, the first region 44 is defined on a portion of the trailing edge 24 and optionally a portion of the suction side 28 (and optionally a portion of the pressure side 26 not shown). The coating system 18 also includes an aluminide coating 34 over the surface 13 of the airfoil 12 on a second region 46. As shown, the second region 46 is defined on the leading edge, a portion of the suction side 28 (and a portion of the pressure side 26), and a portion of the trailing edge 24. Lastly, a thermal barrier coating 36 is exposed on at least a portion of the second region 46 of the surface 13 of the airfoil 12, to define a third region 48. Accordingly, a platinum-group metal aluminide coating 31 is on the surface 13 of the airfoil 12 along at least a portion of the trailing edge 24, and an aluminide coating 34 is over the surface 13 of the airfoil 12 of the leading edge 22, at least a portion of the pressure side 26, and at least a portion of the suction side 28. As such, the leading edge 22 is substantially free from platinum.

A bond coating 32 can be positioned between the surface 13 of the airfoil 12 and the aluminide coating 26, particularly on any portion of the surface 13 of the airfoil 12 only over areas substantially free from platinum (e.g., the second region 46 and the third region 48). Thus, the bond coating 32 can be present on the leading edge 22, at least a portion of the suction side 28, and at least a portion of the pressure side 26. In one embodiment, the thermal barrier coating 36 is on the aluminide coating 26 only over areas having a bond coating 32.

As stated, the nozzle segment can have any number of airfoils (e.g., one (a singlet), two (a doublet), four, six, etc.). Different processing methods can be utilized, depending on the number of airfoils in the nozzle segments. In most embodiment, the film holes can be formed (e.g., drilled) prior to any coating is formed, and may be masked for any subsequent coatings to be applied if desired.

The present invention is generally applicable to components that operate within environments characterized by relatively high temperatures, and particularly to nozzle segments of the type represented in FIG. 1 and therefore subjected to severe oxidizing and corrosive operating environments. It should be noted that the drawings are drawn for purposes of clarity when viewed in combination with the following description, and therefore are not intended to be to scale.

Figure 5:
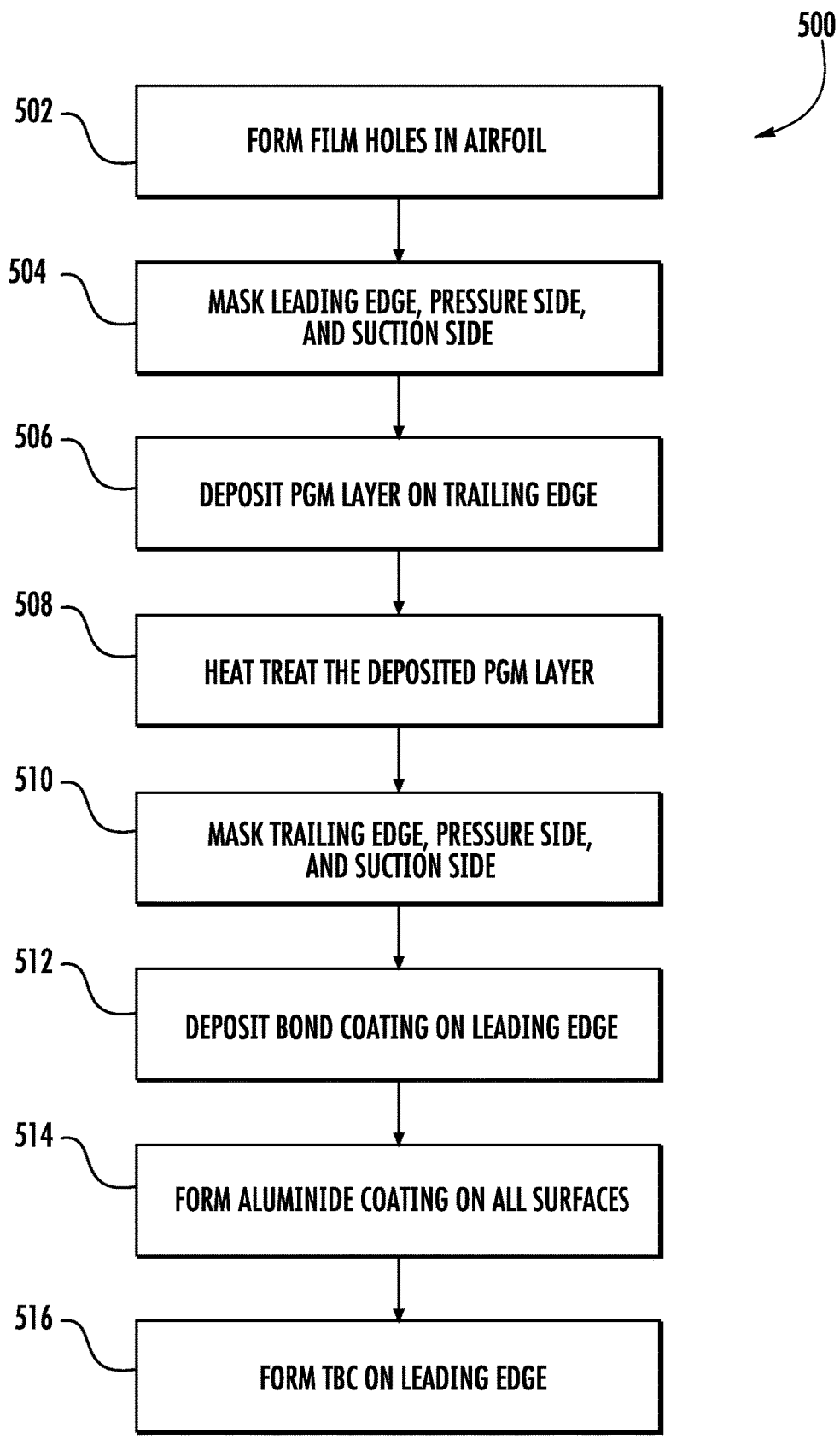
FIG. 5 is a block diagram of an exemplary method of forming a coating on a surface of an airfoil.

Methods are also generally provided for forming a coating on a surface of an airfoil and for repairing a coating on the surface of an airfoil. Referring to FIG. 5, a diagram of an exemplary method 500 is generally shown for forming a coating on a surface of an airfoil. At 502, film holes are optionally formed in an airfoil. At 504, the leading edge, at least a portion of the pressure side, at least a portion of the suction side, and optionally a portion of the trailing edge are masked so as to leave an unmasked region within at least a portion of the trailing edge. At 506, a platinum-group metal (PGM) layer is deposited on the unmasked region (i.e., at over at least a portion of the trailing edge), such as an electroplating process described above. After removing the mask utilized for the PGM layer deposition, the PGM layer is heat treated at 508, such as via heating to a treatment temperature of about 900° C. to about 1200° C. The trailing edge, optionally a portion of the pressure side, and optionally a portion of the suction side can be masked to leave the leading edge exposed at 510. The bond coating is then deposited on the leading edge, and other unmasked regions, at 512. After removing the mask utilized for the bond coating deposition, an aluminide coating can be formed on all the surfaces at 514, such as the vapor deposition. At 516, a thermal barrier coating (TBC) can be formed over the areas where the bond coating is present (e.g., on the leading edge), such as through a plasma spray deposition process.

Figure 6:
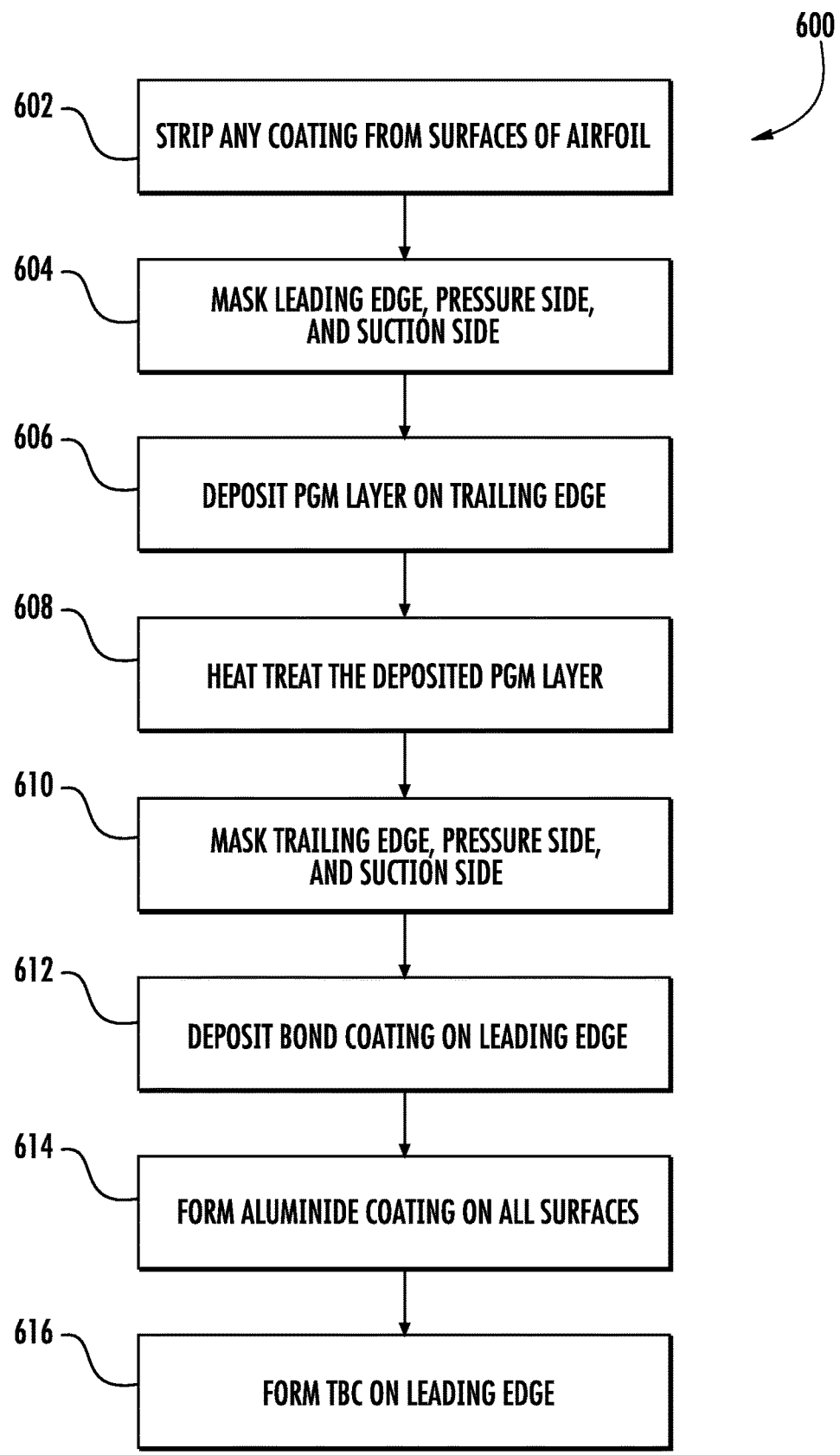
FIG. 6 is a block diagram of an exemplary method of repairing a coating on a surface of an airfoil.

Referring to FIG. 6, a diagram of an exemplary method 600 is generally shown for repairing a coating on a surface of an airfoil. At 602, any and all coatings can be stripped from the surfaces of the airfoil, such as the chemical stripping process (e.g., acid stripping, etc.). At 604, the leading edge, at least a portion of the pressure side, at least a portion of the suction side, and optionally a portion of the trailing edge are masked so as to leave an unmasked region within at least a portion of the trailing edge. At 606, a platinum-group metal (PGM) layer is deposited on the unmasked region (i.e., at over at least a portion of the trailing edge), such as an electroplating process described above. After removing the mask utilized for the PGM layer deposition, the PGM layer is heat treated at 608, such as via heating to a treatment temperature of about 900° C. to about 1200° C. The trailing edge, optionally a portion of the pressure side, and optionally a portion of the suction side can be masked to leave the leading edge exposed at 610. The bond coating is then deposited on the leading edge, and other unmasked regions, at 612. After removing the mask utilized for the bond coating deposition, an aluminide coating can be formed on all the surfaces at 614, such as the vapor deposition. At 616, a thermal barrier coating (TBC) can be formed over the areas where the bond coating is present (e.g., on the leading edge), such as through a plasma spray deposition process.

Through such a repair process, the coating on the trailing edge can be improved through the inclusion of the platinum-group metal without significantly impacting the throat area since the PGM layer (and the resulting PGM-aluminide layer) is not significantly different in thickness than any original aluminide layer (or other coating) that was present on the surface originally. In one embodiment, the aluminide layer deposited at 514 can be formed to a thickness that substantially corresponds to the thickness of an original coating (e.g., within about 10% of the original coating's thickness).

These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged both in whole or in part. Furthermore, those of ordinary skill in the art will appreciate that the foregoing description is by way of example only, and is not intended to limit the invention so further described in the appended claims.

What is claimed is:

1. A method of forming a coating system on a surface of an airfoil having a leading edge, a trailing edge, a pressure side, and a suction side, the method comprising:
   masking the leading edge, at least a portion of the pressure side, and at least a portion of the suction side to define a masked region, wherein at least a portion of the trailing edge defines an unmasked area;
   thereafter, forming a platinum-group metal layer on the surface of the airfoil along the at least a portion of the trailing edge such that the leading edge is substantially free from any platinum-group metal;
   thereafter, removing the mask to leave the surface underlying the masked region substantially free from the platinum-group metal;
   thereafter, forming a bond coating on the surface of the airfoil along the leading edge, wherein the bond coating is formed on the surface of the airfoil only in areas free from the platinum-group metal; and thereafter, forming an aluminide coating over the surface of the airfoil of the leading edge, the trailing edge, the pressure side, and the suction side.

2. The method as in claim 1, wherein forming the platinum-group metal layer on the surface of the airfoil along the trailing edge comprises:
plating the unmasked area with a platinum-group metal to form the platinum-group metal layer.

3. The method as in claim 1, wherein the platinum-group metal layer comprises platinum, rhodium, palladium, or a mixture thereof.

4. The method as in claim 1, wherein the platinum-group metal layer comprises platinum in at least about 50% by weight.

5. The method as in claim 1, wherein the platinum-group metal layer is formed to a thickness of about 1 μm to about 10 μm.

6. The method as in claim 1, wherein the aluminide coating over the platinum-group metal layer forms a platinum-group metal aluminide coating.

7. The method as in claim 6, wherein the platinum-group metal aluminide coating is about 1% to about 10% of the average thickness of the aluminide coating across the leading edge, the pressure side, and the suction side.

8. The method as in claim 1, wherein the aluminide coating is formed to a thickness of about 25 μm to about 100 μm.

9. The method as in claim 1, wherein the aluminide coating is formed via aluminiding by pack cementation.

10. The method as in claim 1, wherein forming the bond coating on the surface of the airfoil along the leading edge comprises:
masking the areas where the platinum-group metal layer was formed; and
forming the bond coating on the surface of the airfoil along the leading edge such that the bond coating is formed on the surface of the airfoil only in areas free from the platinum-group metal.

11. The method as in claim 10, wherein the bond coating comprises a NiCr alloy, and wherein the bond coating is formed to a thickness of about 125 μm to about 525 μm.

12. The method as in claim 10, further comprising:
after forming the aluminide coating, forming a thermal barrier coating over the bond coating.

13. The method as in claim 12, wherein the thermal barrier coating is formed with a taper to transition from the leading edge to the pressure side and to the suction side.

14. The method as in claim 12, wherein the thermal barrier coating is formed via plasma spray deposition.

15. The method as in claim 1, further comprising:
prior to forming the bond coating and forming the aluminide coating, heating the platinum-group metal layer to a treatment temperature of about 900° C. to about 1200° C.

16. The method as in claim 15, wherein the platinum-group metal layer is heated to the treatment temperature in a vacuum having a treatment pressure of 10 torr or less.

17. The method as in claim 1, wherein the bond coating comprises, by weight percent, 17 to 19 wt % chromium, 6 to 7 wt % aluminum, 0.4 to 0.6% hafnium, 9 to 10% cobalt, 5 to 7% tantalum, up to 0.2% yttrium, 1 to 3% rhenium, 0.5 to 1.5% silicon, up to 0.02% zirconium, with the balance being nickel.

18. A method of repairing a coating on a surface of an airfoil having a leading edge, a trailing edge, a pressure side, and a suction side, the method comprising:
stripping any coating from the surface of the airfoil;
thereafter, performing the method of claim 1.

19. The method as in claim 18, wherein the coating was stripped via a chemical stripping process.

* * * * *